United States Patent [19]

Casimir et al.

[11] Patent Number: 4,457,443

[45] Date of Patent: Jul. 3, 1984

[54] MOTOR VEHICLE FUEL TANK VENTING DEVICE

[75] Inventors: Manfred Casimir, Esslingen; Wolf-Dieter Kurz, Stuttgart; Manfred Distel, Ostfildern, all of Fed. Rep. of Germany

[73] Assignee: Daimler-Benz Aktiengesellschaft, Fed. Rep. of Germany

[21] Appl. No.: 383,185

[22] Filed: May 28, 1982

[30] Foreign Application Priority Data

May 30, 1981 [DE] Fed. Rep. of Germany ....... 3121621

[51] Int. Cl.³ .................... B65D 25/00; B65D 90/34; F16K 24/00; B60K 15/02
[52] U.S. Cl. ................................. 220/85 S; 220/20; 220/85 VR; 220/85 VS; 220/86 R
[58] Field of Search ............ 220/85 VR, 85 VS, 85 S, 220/86 R, 373, 374, 20; 137/38, 43

[56] References Cited

U.S. PATENT DOCUMENTS

| | | | |
|---|---|---|---|
| 3,685,528 | 8/1972 | Holland | 137/43 |
| 4,166,550 | 9/1979 | Kleinschmit et al. | 220/86 R X |
| 4,261,477 | 4/1981 | Casimir et al. | 220/86 R X |

FOREIGN PATENT DOCUMENTS 2912214  10/1980  Fed. Rep. of Germany .... 220/86 R

Primary Examiner—Allan N. Shoap
Attorney, Agent, or Firm—Craig & Burns

[57] ABSTRACT

A venting device for fuel tanks which includes equalizing chambers disposed immediately beneath a top wall and approximately centrally with respect to side walls of the fuel tank, with the equalizing chamber being vented to the atmosphere. Vent lines are disposed inside the fuel tank and are connected to the equalizing chamber. The vent lines terminate freely in an interior of a chamber vented to an interior of the fuel tank. The end of the vent lines terminate in vent openings located in an immediate vicinity of an end wall of the chamber which receives the vent line. A single opening is provided for venting each chamber, with the opening being disposed in a wall which is opposite to the chamber end wall receiving the vent line. When the fuel tank rotates about a longitudinal axis of the vehicle, a volume of air, which is in the chambers in an initial position of the fuel tank, is at first forced beneath a surface of the fuel and then, if the tank continues to rotate, escapes through the adjacent vent line into a corresponding guide curve located above, so that a hydraulic siphoning action is interrupted and the escape of fuel through the equalizing line to the atmosphere is prevented.

4 Claims, 5 Drawing Figures

MOTOR VEHICLE FUEL TANK VENTING DEVICE

The present invention relates to a venting arrangement and, more particularly, to a venting device for fuel tanks of a motor vehicle, which includes an equalizing chamber disposed in the tank immediately beneath the top wall thereof and approximately centrally located relative to the side walls. The equalizing chamber is vented to the atmosphere through an equalizing line and to which chamber vent lines are connected. The vent lines are located inside the tank and run on both sides at approximately the same height. The vent lines terminate freely and unsupported in a vicinity of a side wall of the tank opposite the line connection and a vent opening is provided at the end of the line. Each vent line is provided with a chamber inside the tank, which chamber is vented to an interior of the tank with the vent opening terminating inside the chamber.

In designing and constructing fuel tanks for motor vehicles, it is necessary to take certain safety precautions in order to protect against fire. One such safety precaution or regulation provides that no significant amount of fuel may be allowed to flow out of a tank filled with fuel over a predetermined time interval either when the vehicle is in motion or when the vehicle is overturned, as may occur in an accident, with a lateral rotation in a direction of the filler neck.

In Offensegungsschrift No. 2,912,214, a venting device is proposed which meets the above legal regulations or requirements; however, this proposed construction does not guarantee or ensure the prevention of an inadmissible escaping of fuel through the equalizing line to the exterior following several lateral rotations of the tank in any rotational direction nor prevent such escape upon an exceeding of the predetermined or preset time interval.

The aim underlying the present invention essentially resides in providing a venting device for fuel tanks of vehicles such as, motor vehicles, with the venting device being constructed in such a manner that fuel is prevented from escaping even under extreme testing conditions with the venting device exceeding the safety regulations or conditions provided by law.

In accordance with advantageous features of the present invention, an end of the individual vent line which contains the vent opening is disposed in an immediate vicinity of a chamber end wall which receives the vent line. Only a single opening is provided to vent each chamber to an interior of the tank, with the opening being disposed in the chamber end wall which is located opposite the chamber end wall which receives the vent line. Accordingly, the vent opening of each chamber and chamber opening are radially spaced away from the circumferential wall of the chamber, i.e., they are located in the end walls of each chamber in spaced relationship to the juncture of the sidewalls with the end walls, respectively.

By virtue of the above noted constructional features of the venting device of the present invention, when the fuel tank is rotated about a longitudinal axis of the vehicle, the air volume which is pressed in each chamber in the initial position is initially forced beneath the surface of the fuel. As the tank continues to rotate into the positions at which the opening of the equalizing line to the atmosphere is beneath the surface of the fuel, the air volume escapes through the vent opening of the corresponding vent line and into a curve of the vent line located thereabove so that a hydraulic siphoning effect is interrupted thereby preventing the escape of fuel into the environment.

Additionally, with the construction of the present invention, the air volume can be partially compressed by the fuel flowing into the chamber through the additional chamber opening depending upon a direction of rotation of the tank. However, a formation of separating edges ensures that an air cushion will remain in the chamber, with the size of the cushion being determined by a position of the vent opening which terminates in the chamber, i.e., the position of the opening relative to the juncture of the sidewalls or circumferential wall with the end wall of the chamber.

Moreover, the vent opening and chamber opening are, in accordance with the present invention, so disposed relative to the circumferential wall of the chamber, that an air bubble, as large as possible, remains within each chamber when the chamber is submerged in fuel and, more specifically, any possible position in which the fuel tank may be after the vehicle has executed one lateral turn about the longitudinal axis thereof.

In accordance with further advantageous features of the present invention, the vent opening is disposed in a vicinity of a circumferential wall part which delimits a chamber at an upper rear, whereby when the tank is in the position such that the chambers are beneath the surface of the fuel, only a small quantity of fuel may flow out through the additional chamber opening into the corresponding chamber, so that an air bubble which is as large as possible remains therein.

Advantageously, the chambers may, in accordance with the present invention, be formed as a part or component which may be pushed onto the vent line thereby involving relatively low cost for manufacturing and assembly.

Preferably, each chamber of the venting device of the present invention may be disposed inside another chamber which is vented through an equalizing opening and an additional opening closable by means of a blocking element actuatable by centrifugal force and spaced away from the chamber on all sides. By virtue of the last mentioned features of the present invention, not only is fuel prevented from escaping when the tank rotates laterally, but it is also ensured that no fuel can penetrate the vent lines during any movements of the vehicle, especially when rounding alternating curves.

Accordingly, it is an object of the present invention to provide a venting device for fuel tanks of vehicles, especially motor vehicles, which avoids, by simple means, shortcomings and disadvantages encountered in the prior art.

Another object of the present invention resides in providing a venting device for fuel tanks of vehicles, especially motor vehicles, which exceeds present day safety regulations.

A still further object of the present invention resides in providing a venting device for fuel tanks of vehicles which ensures that no fuel escapes to the exterior of the tank even if the tank is rotated laterally.

A still further object of the present invention resides in providing a venting device for fuel tanks of motor vehicles which is simple in construction and therefore relatively inexpensive to manufacture.

These and other objects, features, and advantages of the present invention will become more apparent from the following description when taken in connection with the accompanying drawing which shows, for the purposes of illustration only, several embodiments in accordance with the present invention, and wherein.

Figure 1:
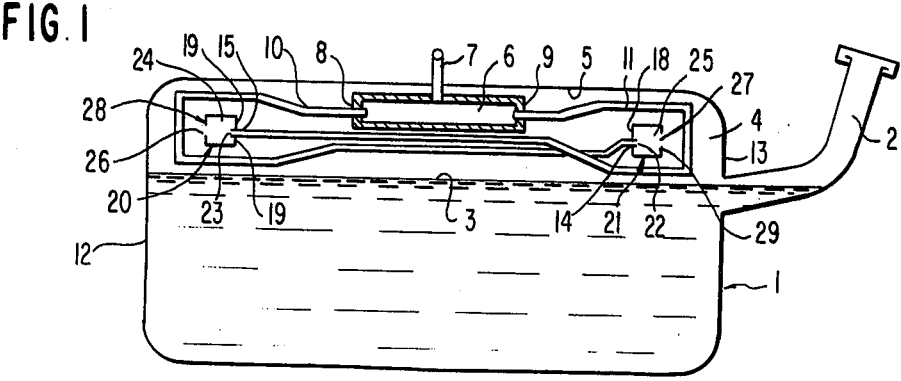
FIG. 1 is a longitudinal cross sectional view of a fuel tank constructed in accordance with the present invention and provided with two chambers each of which is connected with the vent opening at the end of a vent line, with the fuel tank in a normal rest position.

Referring now to the drawings wherein like reference numerals are used throughout the various views to designate like parts and, more particularly, to FIG. 1, according to this figure, a fuel tank generally designated by the reference numeral 1, disposed crosswise or transversely to a longitudinal axis of a vehicle, is provided with a filler neck 2 with the fuel tank 1 accommodating a fuel to the highest fuel level 3. An elongated equalizing chamber 6 is mounted above the highest level of the fuel 3 approximately in the center or middle of an interior of the tank 4 beneath a top wall 5 of the fuel tank 1. The equalizing chamber 6 has an equalizing line 7 which is connected or vented to the atmosphere through the top wall 5 of the fuel tank 1. Vent lines 10, 11 are disposed inside of the fuel tank 1 and communicate through respective sidewalls 8, 9 with the interior of the equalizing chamber 6. The vent lines 10, 11 run immediately beneath the top wall 5 of the fuel tank 1 and extend nearly up to an adjacent respective tank side wall 12 or 13, with the vent lines 10, 11 then reversing direction and running toward the opposite tank side wall 13, or 12 and terminating near the latter. Ends 14, 15 of respective vent lines 10, 11 extend with and pass approximately centrally through one end wall 18 or 19 of a respective chamber generally designated by the reference numerals 20 and 21. The chambers 20, 21 may, for example, be of a rectangular configuration with vent openings 22, 23 terminating as near as possible to the center of chamber end wall 18 or 19 in the interiors 24, 25 of the chambers 20, 21.

The chambers 20, 21 are each provided, respectively, with an additional opening 26, 27, with the additional openings 26, 27 being provided in a respective end wall 28, 29 of the chambers 20, 21, with the walls 28, 29 being respectively disposed opposite the chamber end walls 19, 18. The vent openings 22 and 23 and the chamber openings 26, 27 are spaced from the juncture of the end walls with the interconnecting circumferential wall or side walls of each respective chamber.

The operation of the venting device of the present invention will be described more fully hereinbelow in connection with FIGS. 1-4.

Figure 2:
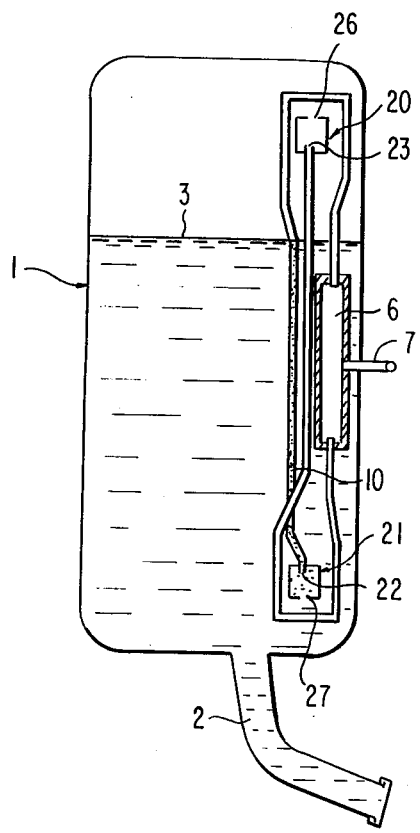
FIG. 2 is a cross sectional view of the fuel tank of FIG. 1 rotated through 90° to the right.

If the fuel tank 1 is rotated from the resting position in FIG. 1 in a direction of the filler neck through 90° to the position shown in FIG. 2, fuel will flow through opening 27 in the chamber 21 and through the vent opening 22 in to the vent line 10 until the level 3 of fuel is reached and fuel can then not escape.

Figure 3:
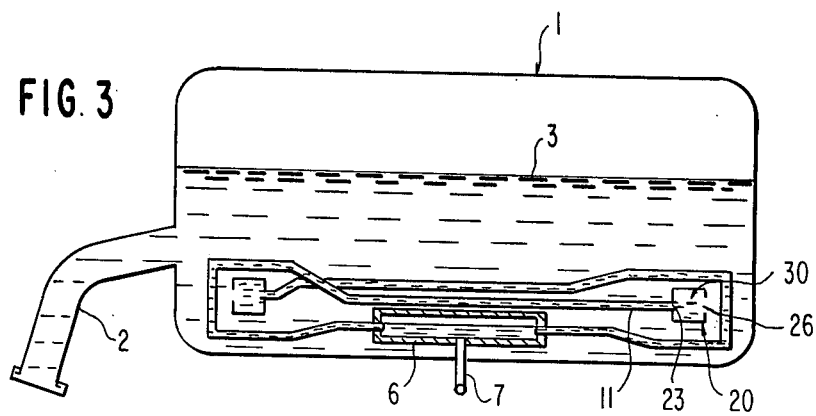
FIG. 3 is a cross sectional view of the fuel tank of FIG. 1 rotated through 180° to the right.

As the fuel tank 1 continues rotating clockwise through 90° from the position shown in FIG. 2 to the position shown in FIG. 3, the air volume contained in the chamber 20, as shown in FIG. 2, is pushed beneath the level 3 of the fuel. Simultaneously, fuel flows into the chamber 20 through the opening 26 therein, with the fuel passing through the vent opening 23 and vent line 11 into the entire vent device up to the equalizing line 7 at the level 3 of the fuel, whereby an air volume in the chamber 20 is only partially compressed by the inflowing fuel, approximately up to the level of the vent opening 23 so that an air cushion 30 located above, remains in the chamber 20. With these conditions existing, fuel cannot escape because the opening (not shown) of the equalizing line 7 is in the atmosphere at a position, for example, above the level 3 of the fuel. Additionally, a blocking valve constructed, for example, as a float or check valve, may be disposed in the equalizing line 7 so that the opening of the equalizing line 7 can be located below the level 3 of the fuel if desired.

A radial spacing of the vent opening 22 or 23 and chamber opening 26 or 27 with respect to the circumferential wall, i.e., interconnecting sidewalls of the chamber ensures that the air cushion 30 remains trapped in the chamber 20 with the vehicle in any possible lateral position.

Figure 4:
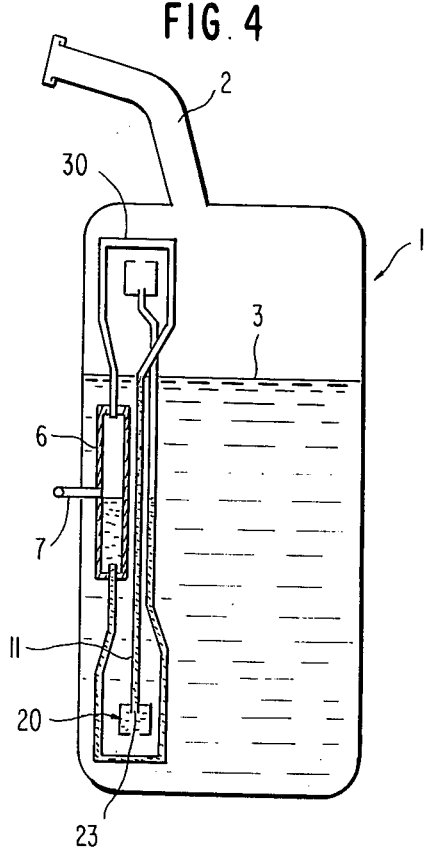
FIG. 4 is a cross sectional view of the fuel tank of FIG. 1 rotated to 270° through the right.

As the fuel tank 1 continues to rotate clockwise through another 90° from the position shown in FIG. 3 to the position shown in FIG. 4, wherein the equalizing line 7 is located beneath the level 3 of the fuel, and in which position escape of the fuel is also to be prevented, the air cushion 30 is displaced from the position shown in FIG. 3, out of the chamber 20 through the vent opening 23 in the vent line 11, upwardly until the air cushion 30 reaches the upper guide curve in the line 11, whereby a hydraulic siphoning action or the flow of fuel is interrupted thereby avoiding the inadmissible escaping of fuel.

As the fuel tank rotates counterclockwise from a position shown in FIG. 1 to the position shown in FIG. 2, in which an inadmissible escape of fuel is also to be prevented, the air volume present in the chamber 20 as shown in FIG. 1, is immediately pushed beneath the level or surface 3 of the fuel and rises through the vent opening 23 and vent line 11 immediately into the upper guide curve of the vent line 11 so that no more fuel can escape. As can readily be appreciated, the specific actions outlined hereinabove in connection with the rotation of the tank apply equally to further rotations of the tank 1. The same would also apply to any number of rotations of the tank in alternate rotational directions.

In contrast to the illustrated embodiment, in situations wherein the fuel tank is provided with an equalizing line extending transversely of the longitudinal axis of the vehicle toward one side wall of the fuel tank with the equalizing line terminating at the one side wall, it is sufficient for the function of the venting device of the present invention to provide the vent opening, which terminates freely in an interior through a side wall of a respective chamber.

Figure 5:
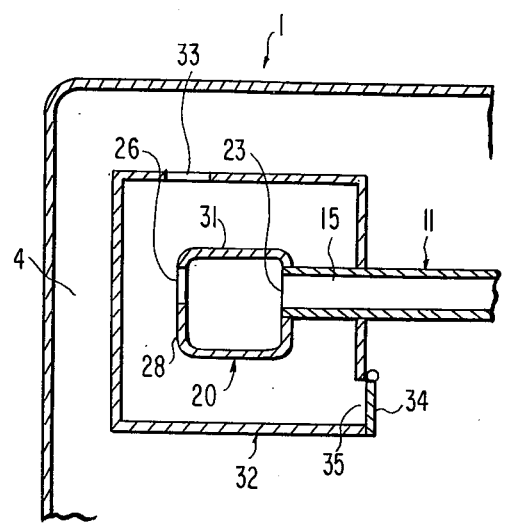
FIG. 5 is a partial cross sectional view, on an enlarged scale, of a fuel tank similar to FIG. 1, with a vent opening terminating in a vicinity of a top of a chamber and into the interior of the chamber, with the chamber being disposed interiorily of another chamber.

FIG. 5 provides an example of another embodiment of a lefthand chamber 20 of a venting device for a fuel tank 1. As shown in FIG. 5, the vent line 1 terminates in a vicinity of a circumferential or interconnecting wall part 31, i.e., proximate the wall rather than being centrally located, with the wall part 31 delimiting the chamber 20 at the top rear, and with the vent opening 23 extending through but ending flush with the inside of chamber end wall 19. The vent opening 23 is disposed opposite the opening 26 in the chamber 20. The chamber 20 is disposed inside an additional chamber generally designated by the reference numeral 32, with the additional chamber 32 being vented through an equalizing opening 33 and an additional opening 35. The additional opening 35 is adapted to be closed by a surge valve 34 with respect to an interior 4 of the tank 1.

With the construction of FIG. 5, only a small quantity of fuel can flow into the chamber 20 through the chamber opening 26. The vent line 11 terminates into the chamber 20 at a position near the top wall 31 of the chamber 20 and, when the tank 1 is in the position illustrated in FIG. 3, an air cushion is formed above the chamber 20 which is as large as possible. The arrangement of the chamber 20 in the additional chamber 32 prevents fuel from entering the vent line 11 during movements of the fuel which are produced, in particular, by rounding alternate curves, and by a closure of the opening 35 by the surge valve 34 which occurs as a function of centrifugal force and the pressure of the fuel, whereby a formation of an air cushion 30 which is as large as possible is further enhanced. As can readily be appreciated, the righthand chamber 21 in FIG. 1 may also be constructed in the same manner as illustrated in FIG. 5.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein but intend to cover all such modifications as are encompassed by the scope of the appended claims.

We claim:

1. A venting device for fuel tanks of vehicles, the venting device including an equalizing chamber means disposed in the fuel tank at a position below a top wall thereof and generally centrally with respect to side walls of the fuel tank, means for venting the equalizing chamber means to the atmosphere, a plurality of vent line means disposed in the fuel tank interior, each of the plurality of vent line means including a first end and a second end, the first end of each of said plurality of vent line means terminating at approximately the same height relative to opposed walls of the equalizing chamber means, the second end of each of the plurality of vent line means terminating generally proximate respective opposite side walls of the fuel tank, a plurality of end chamber means corresponding in number to the number of vent line means disposed in the fuel tank interior, the second end of each of the plurality of vent line means having an end chamber means associated therewith, each of the end chamber means including opening means for venting the respective end chamber means to the fuel tank interior and means for receiving the respective second end of the respective vent line means, the opening means for venting including a single chamber opening provided in a distal end wall of the respective end chamber means opposite a wall having the means for receiving the second end of a respective vent line means, said opening means and means for receiving of each end chamber means being spaced with respect to the juncture of a continuous wall means joining the distal end wall and the opposite wall.

2. A venting device according to claim 1, wherein the continuous wall means delimits each of the respective end chamber means, the opening means being disposed in a vicinity of the respective juncture of the continuous wall means and the distal end wall.

3. A venting device according to claim 2, wherein each of the plurality of the end chamber means is constructed as individual components which are adapted to be fitted onto the second end of each respective vent line means.

4. A venting device according to one of claims 1, 2, or 3, including further chamber means provided for respectively accommodating each of the plurality of end chamber means in such a manner that each respective end chamber means is spaced at a distance from the associated further chamber means on all sides thereof, equalizing opening means provided in each of the further chamber means for venting the respective further chamber means with the fuel tank interior, additional opening means provided in each of the further chamber means for venting with the fuel tank interior, and blocking means actuatable by centrifugal force for opening and closing the additional opening means in each respective further chamber means.

* * * * *